United States Patent [19]
Mercuri et al.

[11] Patent Number: 5,976,727
[45] Date of Patent: Nov. 2, 1999

[54] ELECTRICALLY CONDUCTIVE SEAL FOR FUEL CELL ELEMENTS

[75] Inventors: Robert Angelo Mercuri, Seven Hills; Jeffery John Gough, Olmsted Township, both of Ohio

[73] Assignee: UCAR Carbon Technology Corporation, Danbury, Conn.

[21] Appl. No.: 08/934,292

[22] Filed: Sep. 19, 1997

[51] Int. Cl.[6] ................................................. H02M 8/02
[52] U.S. Cl. ............................................................. 429/37
[58] Field of Search .................................. 429/35, 36, 37

[56] References Cited

U.S. PATENT DOCUMENTS

| | | | |
|---|---|---|---|
| 3,404,061 | 10/1968 | Shane et al. | 161/125 |
| 4,895,713 | 1/1990 | Greinke et al. | 423/448 |
| 4,973,531 | 11/1990 | Zaima et al. | 429/37 |
| 4,988,583 | 1/1991 | Watkins et al. | 429/30 |
| 5,108,849 | 4/1992 | Watkins | 429/30 |
| 5,176,863 | 1/1993 | Howard | 264/113 |
| 5,240,786 | 8/1993 | Ong et al. | 429/36 |
| 5,300,370 | 4/1994 | Washington | 429/34 |
| 5,407,759 | 4/1995 | Ohsuga | 429/35 |
| 5,494,506 | 2/1996 | Ford et al. | 55/502 |
| 5,523,175 | 6/1996 | Beal et al. | 429/36 X |
| 5,531,454 | 7/1996 | Borneby | 277/26 |
| 5,837,395 | 11/1998 | Breault et al. | 429/35 |

*Primary Examiner*—Stephen Kalafut
*Attorney, Agent, or Firm*—Frederick J. McCarthy

[57] ABSTRACT

An electrically conductive seal for bonding together individual electrical fuel cells into an assembly in the form of a stack in which the individual electrical fuel cells are electrically connected together by the electrically conductive seal.

2 Claims, 10 Drawing Sheets

ELECTRICALLY CONDUCTIVE SEAL FOR FUEL CELL ELEMENTS

FIELD OF THE INVENTION

The present invention relates to an electrically conductive seal for bonding together individual electrical fuel cells into an assembly in the form of a stack in which the individual electrical fuel cells are electrically connected together by the electrically conductive seal.

BACKGROUND OF THE INVENTION

The term "flexible graphite" as used herein represents the exfoliated reaction product of rapidly heated natural graphite particles which have been treated with an agent that intercalates into the crystal-structure of the graphite to expand the intercalated particles at least 80 or more times in the direction perpendicular to the carbon layers in the crystal structure. Flexible graphite and the making thereof is described in U.S. Pat. No. 3,404,061 Shane et al. Expanded, i.e. exfoliated graphite may be compressed into thin sheets (hereinafter referred to as flexible graphite) with a density approaching theoretical density, although a density of about 10 to 85 lbs./ft.$^3$ is suitable for most applications, including compression into shapes suitable as seal rings in engine exhaust and other applications.

A common method for making expandable graphite particles, described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. After the flakes are intercalated excess solution is drained from the flakes and after washing with water, the intercalated graphite flakes are dried and are expandable upon exposure to a flame for only a few seconds. The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms, i.e. expanded graphite, may be compressed together into flexible sheets which, unlike the original graphite flakes, can be formed and cut into various shapes for gasket and sealing purposes.

Flexible graphite is coherent, with good handling strength, and flexible graphite foil can be wound into rolls and can also be wrapped around metal fixtures such as mandrels, possesses desirable heat transfer properties and is, accordingly, particularly useful for high temperature applications such as engine exhaust seal ring applications. The surfaces of flexible graphite sheets are porous and uneven and have been proposed to increase the sealability of flexible graphite sheet or foil by impregnating the same with resin. However, the surface layers of flexible graphite sheet or foil, due to the alignment of exfoliated graphite particles and the constituent layers of atoms parallel to the surface of the flexible sheet or foil, resist resin impregnation when the sheet or foil is immersed in liquid resin. However, due to the well known anisotropy of flexible graphite, resin will flow readily within the flexible graphite sheet in directions parallel to the opposed parallel planar surfaces of the sheet or foil and the planes of the constituent graphite particles of the sheet, i.e. transverse to the "c axis" direction of the graphite particles if penetration into the flexible graphite sheet can first be achieved. The porosity of the surfaces of flexible graphite sheet, however, does provide the opportunity for use as a bonding substrate.

SUMMARY OF THE INVENTION

Flexible graphite sheet, and in particular a composite of a resin containing sheet of flexible graphite having opposed parallel, planar outer surfaces and needle-shaped ceramic fiber particles which are embedded in the flexible sheet and which extend from interior the flexible sheet to at least one of the planar outer surfaces of the flexible graphite sheet can be formed into a flow field plate for electrochemical fuel cells. The present invention involves an electrically conductive seal formed of a resin containing sheet of flexible graphite between the flow field plates of individual electrochemical fuel cells.

DETAILED DESCRIPTION

In the practice of a particular embodiment of the present invention, intercalated natural graphite flakes are mixed and blended with from about 1.5 to 30% by weight of needle-shaped ceramic fiber particles having a length of 0.15 to 1.5 millimeters. The width of the particles should be from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The mixture of intercalated natural graphite flake and needle-shaped ceramic fiber particles, in which the graphite flake and ceramic fiber particles are in general alignment, is exposed to a flame at a temperature up to 2500° F. to exfoliate, i.e. expand the intercalated graphite flake into expanded graphite particles from 80 to 1000 times the volume of the unexpanded intercalated natural graphite flake which surround and entrap the needle-shaped ceramic fiber particles. Due to the expansion, the ceramic fiber particles are no longer in substantial alignment with the graphite particles but are randomly positioned in the mixture of exfoliated graphite and ceramic fiber. The mixture of exfoliated graphite particles and randomly oriented needle-shaped ceramic fiber particles is roll-pressed into sheet or foil typically 0.1 to 3.5 mm thick. The resultant sheet, or foil, is characterized by having needle-shaped particles extending from interior of the flexible graphite sheet to and through at least one of the opposed planar surfaces of the flexible graphite sheet. Since the needle-shaped ceramic fiber particles are non-reactive and non-adhering to the graphite in the flexible sheet, a plurality of annular channels surrounding the respective needle-shaped particles is provided in the flexible graphite sheet extending from the opposed surfaces of the sheet into the body of the sheet. These channels, with the flexible graphite sheet immersed in liquid resin, receive the resin which then infiltrates the flexible graphite sheet in the more permeable direction parallel to the planar surfaces of the flexible graphite sheet and the pressed, exfoliated graphite particles forming the sheet, assisted by channels formed by needle shaped ceramic fiber particles embedded between, but not penetrating the planar parallel surfaces of the flexible graphite sheet. The ceramic fiber particles remain stable during all steps of the processing treatment so that the channels are not blocked by melted fiber or fiber decomposition products. After curing, i.e. thermosetting, of the resin within the graphite sheet the sealability of the flexible graphite sheet is enhanced for seals and gaskets formed from said sheet while the high electrical conductivity of the flexible graphite is retained. Accordingly, this material can be utilized as an electrically conductive seal between the electrochemically active elements of a fuel cell stack. In a preferred embodiment the resin-containing sheet is calendered by roll pressing between pressure rolls.

Figure 1:
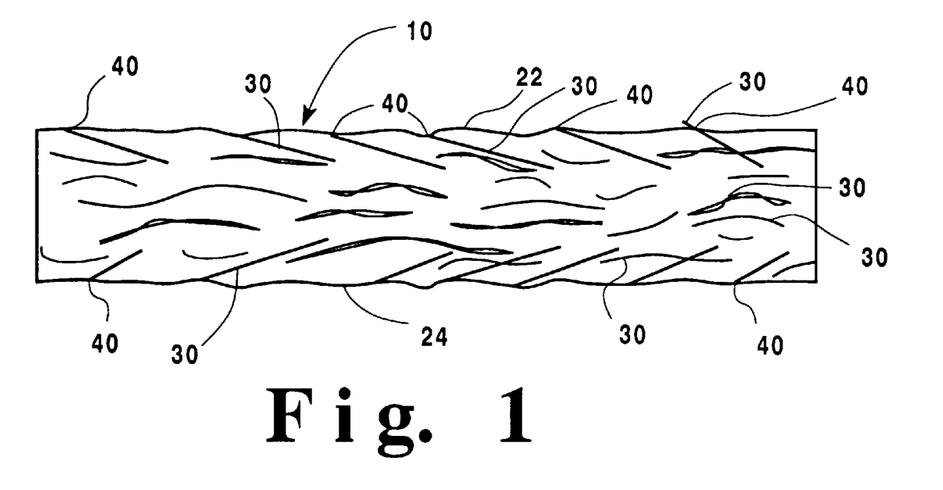
FIG. 1 shows, in an enlarged cross-section sketch of a sheet of flexible graphite (original thickness of 0.01 inch) containing ceramic fibers suitable in the practice of the present invention.

FIG. 1 is a drawing sketch based on microscope observations of 0.01 inch thick sheets of flexible graphite which shows a flexible graphite sheet 10, in cross-section, with parallel opposed planar surfaces 22, 24. Embedded ceramic fiber particles are shown at 30. Penetration of sheet 10 by ceramic fibers 30 is illustrated at 40.

EXAMPLE I

Natural graphite flake, sized 80% by weight held on 50 mesh was treated in a mixture of 90 wt. % sulfuric acid and 10 wt. % nitric acid. The thus treated intercalated graphite flake was water washed and dried to about 1% by weight water. One (1) pound of this intercalated flake was mixed with 0.15 pounds of needle-shaped ceramic fiber of commercially available calcium metasilicate sized mostly with a 15 to 1 aspect ratio. The mixture of intercalated graphite and calcium metasilicate fiber was introduced into a furnace of 2500° F. to obtain rapid expansion of the intercalated graphite flake into vermicular worm-shaped particles having a volume of about 325 times that of the unexpanded intercalated flake. The expanded worm-shaped particles surrounded the admixed calcium metasilicate fibers and the mixture was rolled into a flexible graphite sheet 0.01 inch thick and 24 inches wide in which admixed calcium metasilicate fibers extended from a surface of the sheet into the body of the sheet which contained about 12% by weight of the calcium metasilicate fiber.

Figure 2:
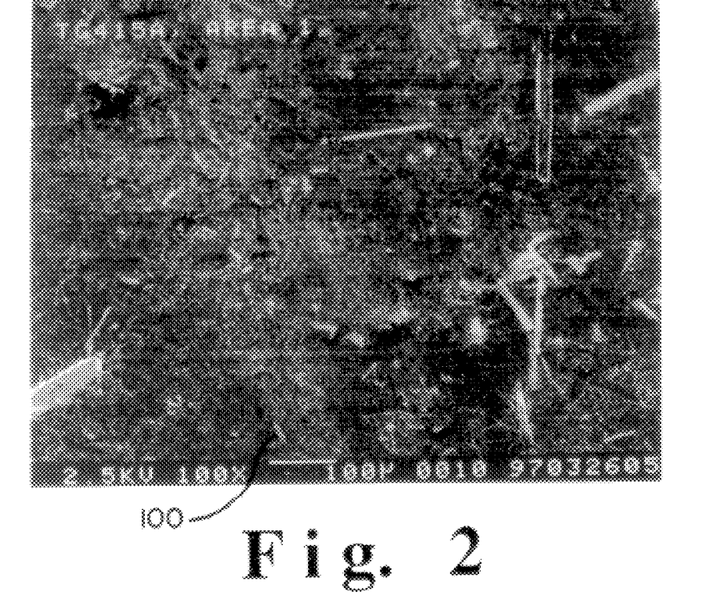
FIGS. 2 through 6 are electron microscope views (original magnification 100X) at increasing electron beam intensity voltages (2.5 KV to 40 KV) of a portion of a planar surface of a flexible graphite sheet containing ceramic fibers of the type illustrated in FIG. 1.
Figure 3:
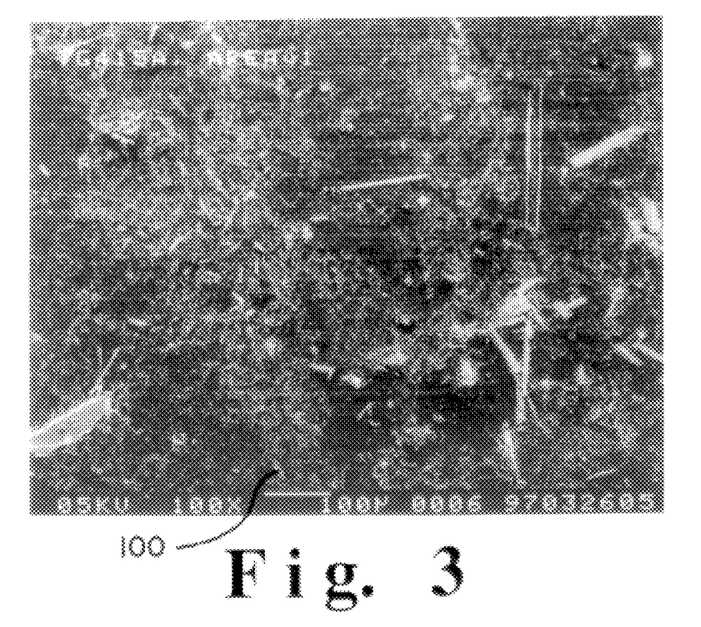
Figure 4:
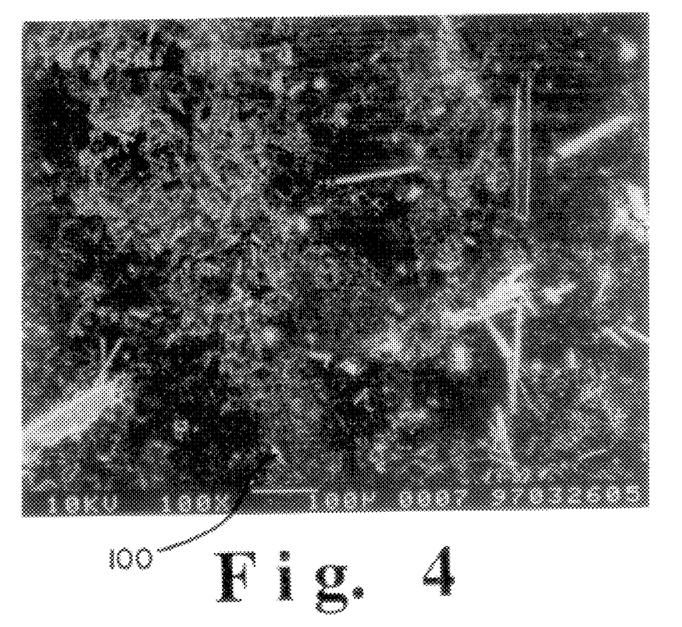
Figure 5:
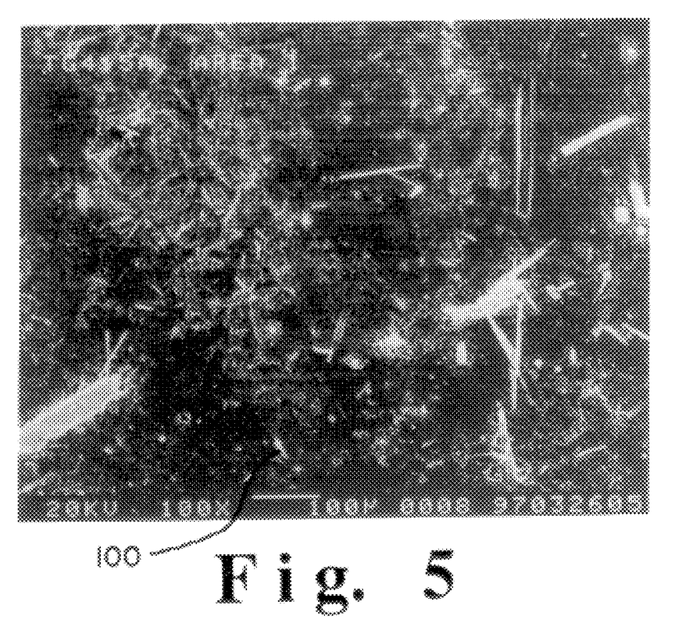
Figure 6:
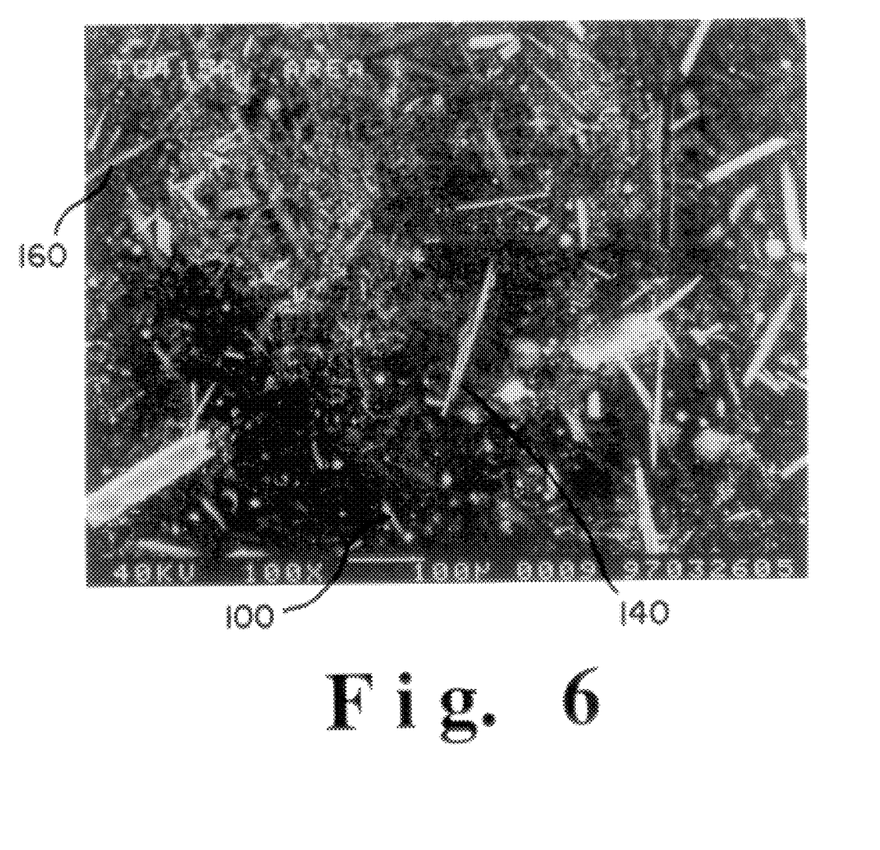

The electron microscope view of FIG. 2 (100X—see 100 micron scale) shows the upper portion of a ceramic fiber 100 which penetrates a planar surface 22 of a flexible graphite sheet. FIGS. 3 to 6, at increasing voltages, look "deeper" into the flexible graphite sheet and show the penetration of ceramic fiber 100 into the flexible graphite sheet. Ceramic fibers embedded in the flexible graphite sheet below surface 72 are shown at 140, 160.

EXAMPLE II

A sample of the sheet of Example I, 8 inches wide was immersed in and pulled through a solution 10% phenolic resin with acetone diluent at a rate of 10 feet per minute. After immersion and drying, the sample showed an increase in weight of 18.7%.

The sample was further treated by heating to 235° C. to cure and stabilize the resin and the sheet was calendered between pressure rolls to a density of 1.5 gms/cc. The calendered sheet was soaked in oil and water and was unaffected, i.e. impervious. A control sheet without any added ceramic fiber or resin additives exposed to the same test conditions increased about 35% in weight and 8% in thickness.

Sample sheets with 5%, 15% and 25% by weight of calcium metasilicate fibers as additive were pulled through the resin solution at a rate of 10 feet per minute and were saturated with resin at about 17–19% by weight of resin. A control sample without any added ceramic fiber retained only 5% by weight of resin at the same pull rate of 10 feet per minute.

EXAMPLE III

Figure 7:
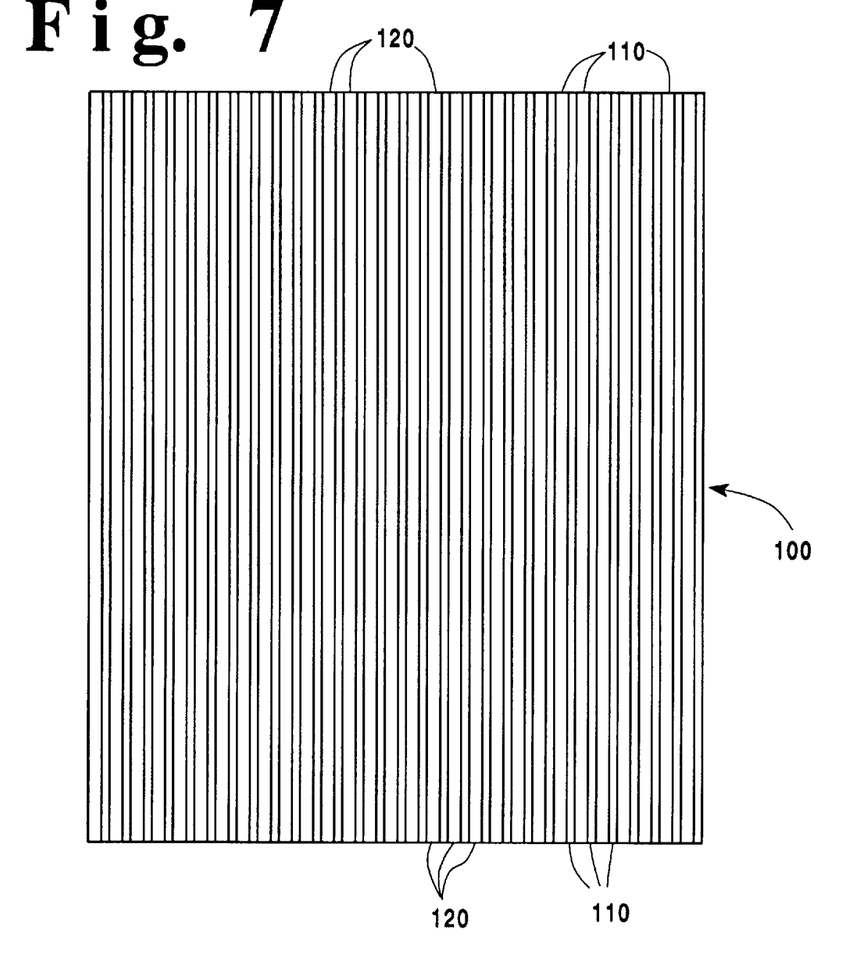
FIGS. 7 and 7A show a portion of a sheet of flexible graphite containing ceramic fibers which has been mechanically deformed into a grooved plate for use as a flow field plate in an electrochemical fuel cell.
Figure 7A:
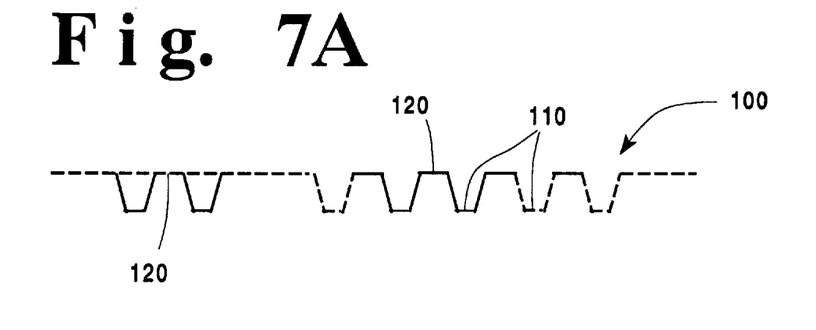

Calendered flexible graphite sheet material of the type described in Example I containing 5% by weight of calcium metasilicate fibers (100 mm×100 mm) was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. The walls 120 are typically 1–1.5 mm inch thick. The density before mechanical deformation is approximately 0.1 to 0.3 gm/cc and after stamping is typically exceeds 1.1 g/cc. The plate 100 of FIGS. 7, 7A is subjected to impregnation using the resin of Example II under pressure of about 15 psi to provide about 20% by weight of resin in the plate after being cured by heating to 235° C. The resin impregnated plate, as compared to prior art graphite plates with milled grooves, has increased flexural strength, improved heat dispersion and lower voltage drop across its thickness when in use as a fluid flow field plate in a fuel cell.

EXAMPLE IV

A one square foot sample of sheet containing 5% by weight fiber of the type described in Example I was immersed in the diluted resin solution of Example I for a period of 15 seconds such that the sheet contained a uniform distribution of 15% by weight resin. The sheet was dryed to a tack free condition (100° C.) and was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. the walls 120 are typically 1–1.5 mm inch thick. The density before mechanical deformation is approximately 0.1 to 0.3 gm/cc and after stamping is typically exceeds 1.1 g/cc. The plate 100 of FIGS. 7, 7A was then heated slowly to 235° C. to achieve the property improvements of Example III.

Figure 9:
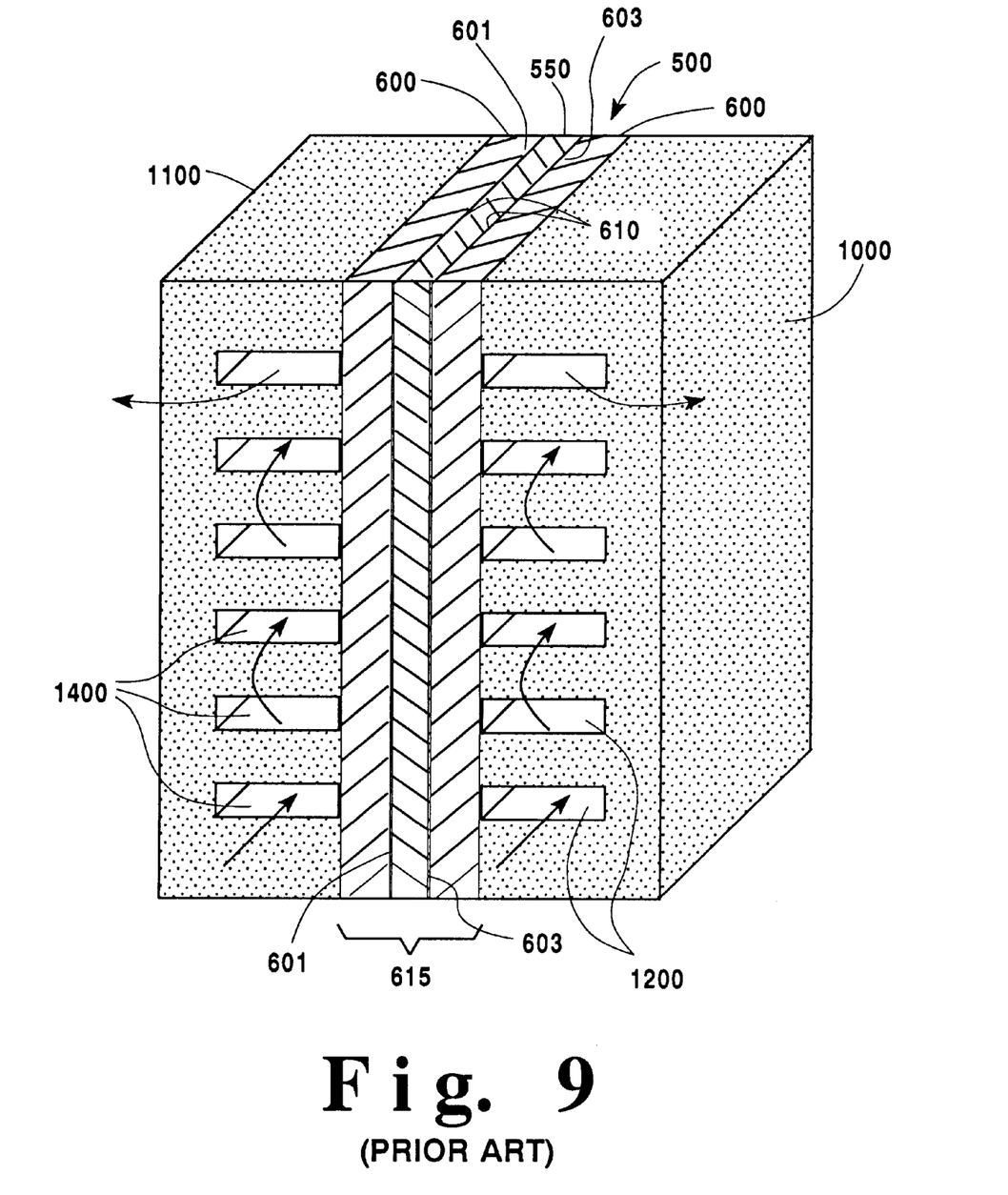
FIG. 9 shows, schematically, a prior art electrochemical fuel cell.

FIG. 9 shows, schematically, the basic elements of a Fuel Cell, more complete details of which are disclosed in U.S. Pat. Nos. 4,988,583 and 5,300,370 and PCT WO 95/16287 (Jun. 15, 1995).

With reference to FIG. 9, the Fuel Cell indicated generally at 500 comprises electrolyte in the form of a plastic e.g. solid polymer membrane electrolyte 550. A pair of carbon fiber electrodes 600 are coated at the electrode-membrane interfaces 601, 603 with a catalyst 610, e.g. platinum, to render them electrochemically active. Membrane 550 and catalyst coated electrodes 600 constitute a membrane electrode assembly 615 with an electrocatalytically active reaction at the membrane/electrode interfaces 601, 603. Flow field plates 1000, 1100 abut the electrodes 600 and fuel, e.g. hydrogen gas, is circulated through grooves 1200 of fuel flow field plate 1000. In operation, the fuel flow field plate 1000 becomes an anode, and the oxidant flow field plate 1100 becomes a cathode with the result that an electric potential, i.e. voltage is developed between the fuel flow field plate 1000 and the oxidant flow field plate 1100 due to the electrocatalytically active membrane electrode assembly positioned between the opposing grooved surfaces of fluid flow field plates 1000, 1100. The above described electrochemical fuel cell is combined with others in a fuel cell stack to provide an electrochemically active section of fuel cells electrically connected in series (or parallel) to achieve a desired level of electric power as described in the above-noted U.S. Pat. No. 5,300,370.

Figure 8:
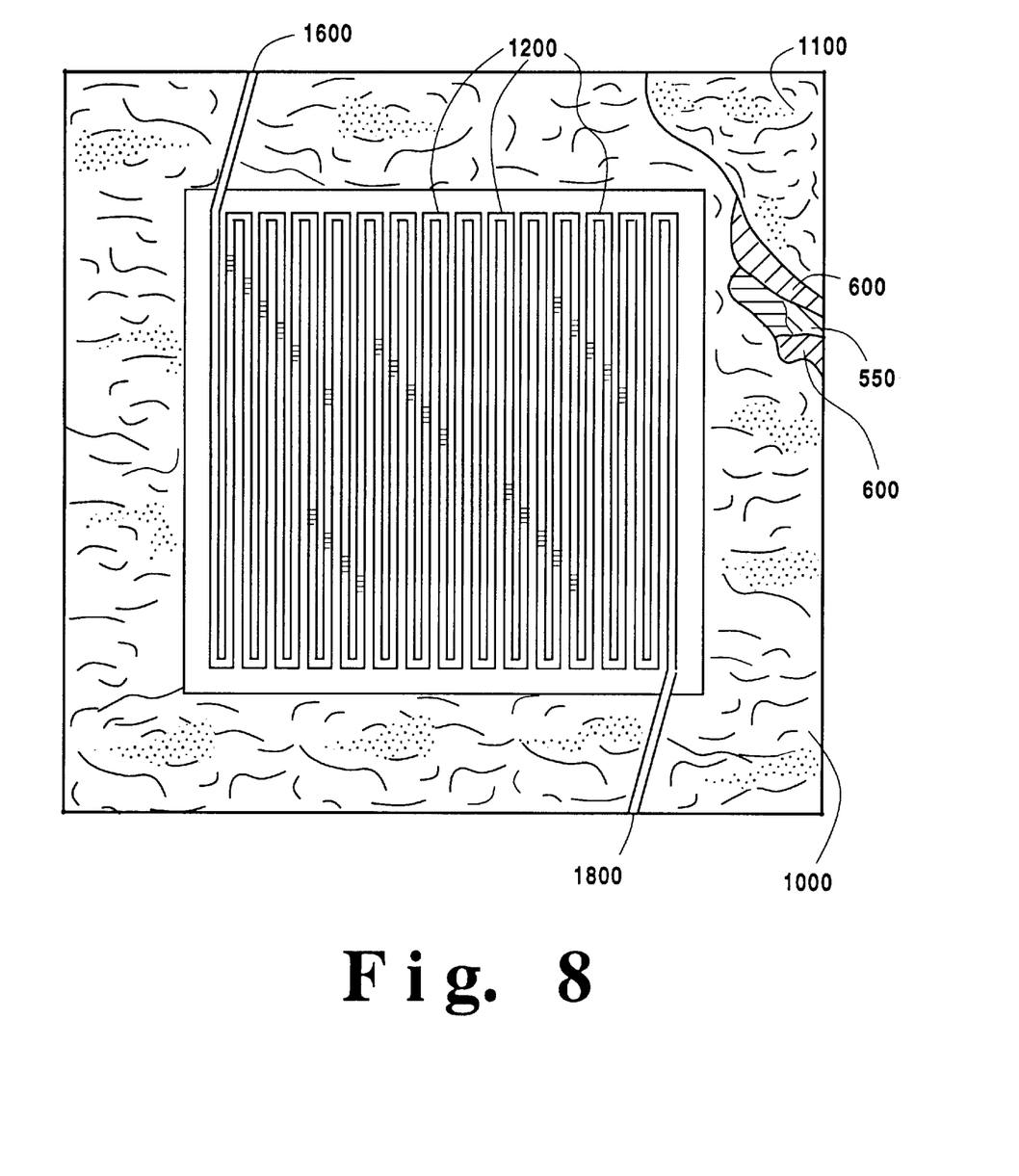
FIGS. 8 and 8A show a top and partial side elevation view (in section) of flow field plates as components of a fuel cell.
Figure 8A:
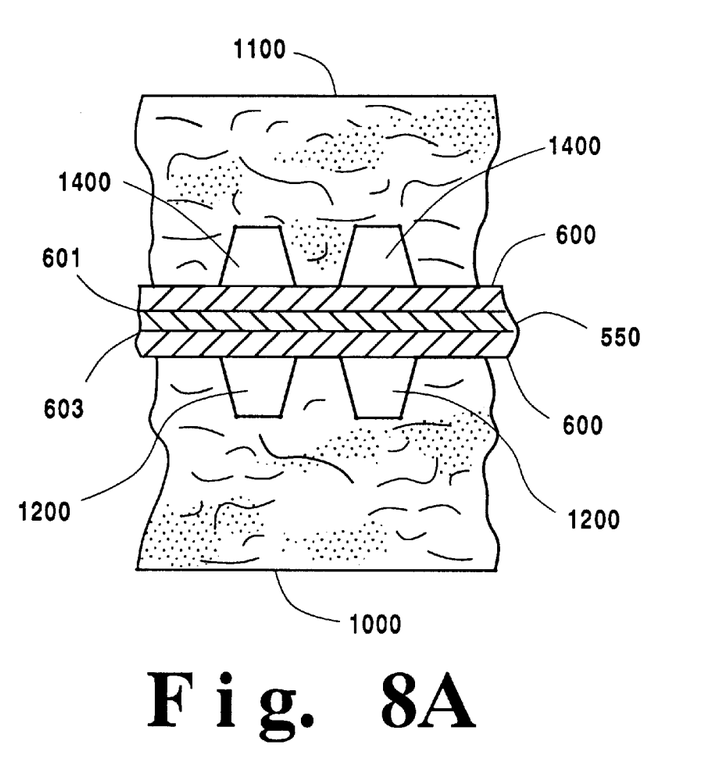

A fluid flow field plate 1000 having a continuous reactant flow channel, of the type described in Watkins U.S. Pat. No. 4,988,583, is shown in FIG. 8 and FIG. 8A. The plate is resin containing flexible graphite sheet which contains 12% by weight calcium metasilicate fibers of the type described in Example III. A surface of plate 1100 has formed therein by stamping or molding, a single continuous fluid flow channel 1200 which has a fluid inlet 1600 and a fluid outlet 1800. Fluid inlet 1600 is connected to a source of fuel (not shown) in the case of the anode flow field plate, or a source of oxidant (not shown) for the cathode flow field plate. Channel 1200 traverses in a plurality of passes a major central area of plate 1000, which corresponds to the electrocatalytically active region of the anode or cathode to which it is adjacent when assembled as shown in FIG. 8A. When assembled in fuel cell stack, each flow field plate also functions as a current collector.

Figure 10:
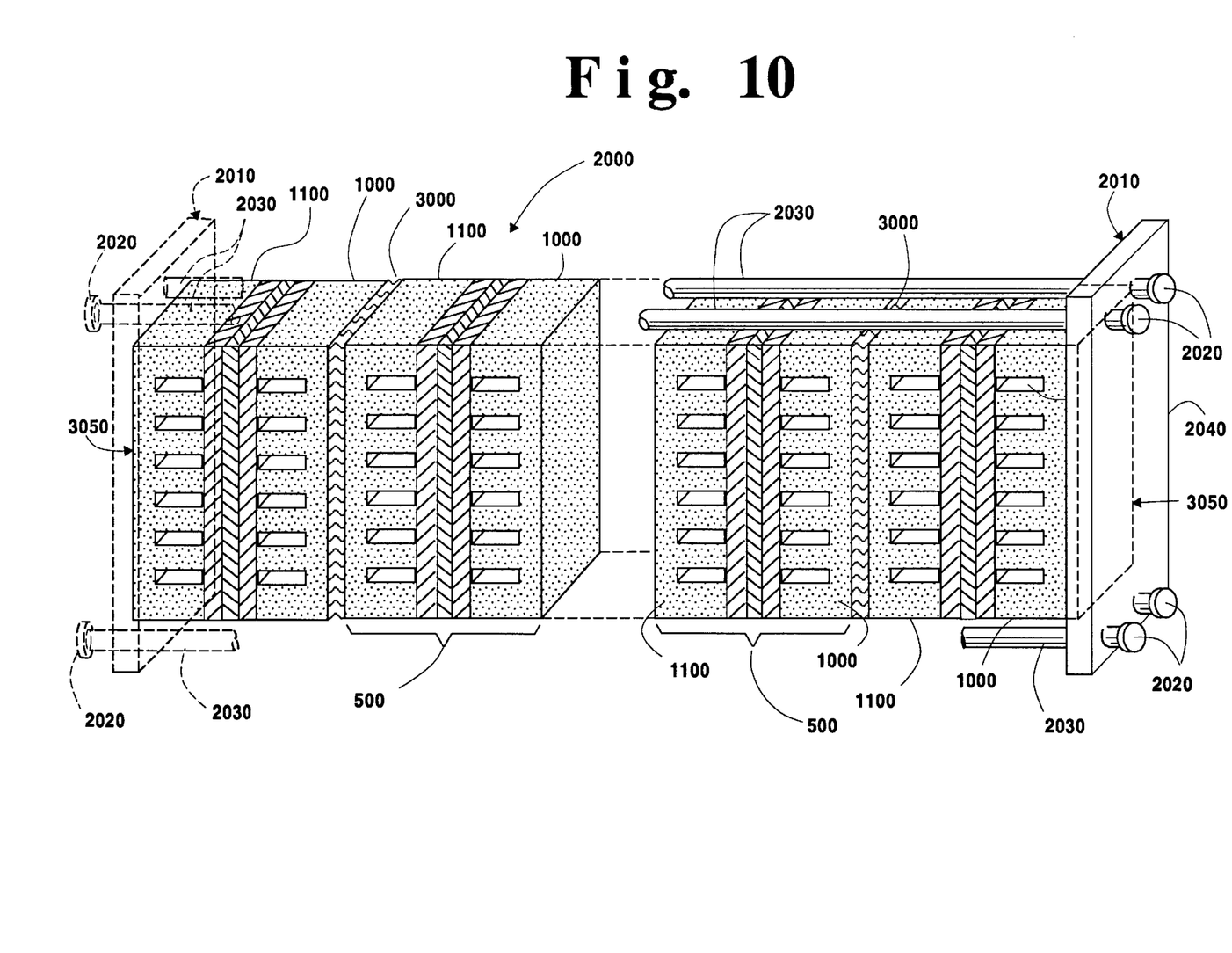
FIG. 10 shows a plurality of electrochemical fuel cells arranged in a stack.
Figure 11:
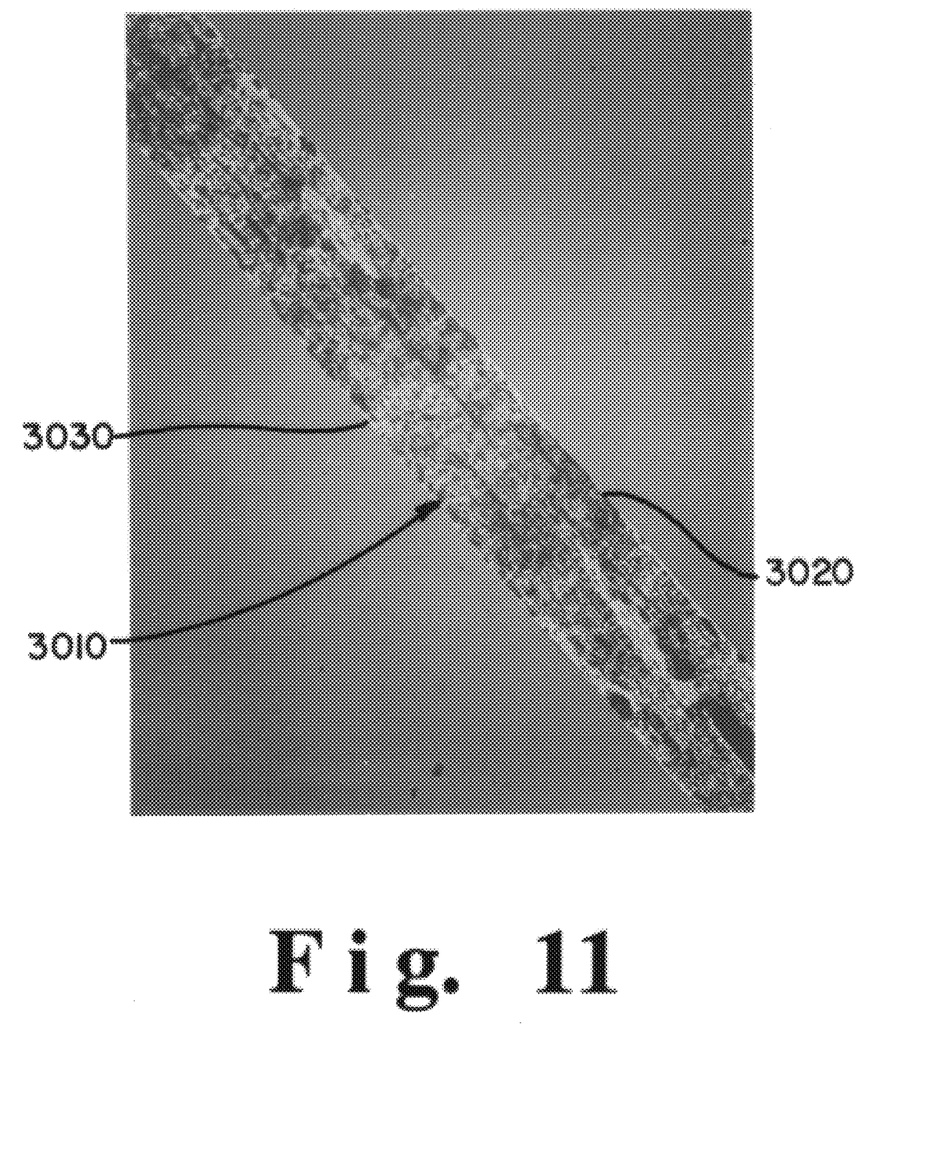
FIG. 11 shows, at an original magnification of 35x, a sheet of flexible graphite suitable for use in the present invention.
Figure 12:
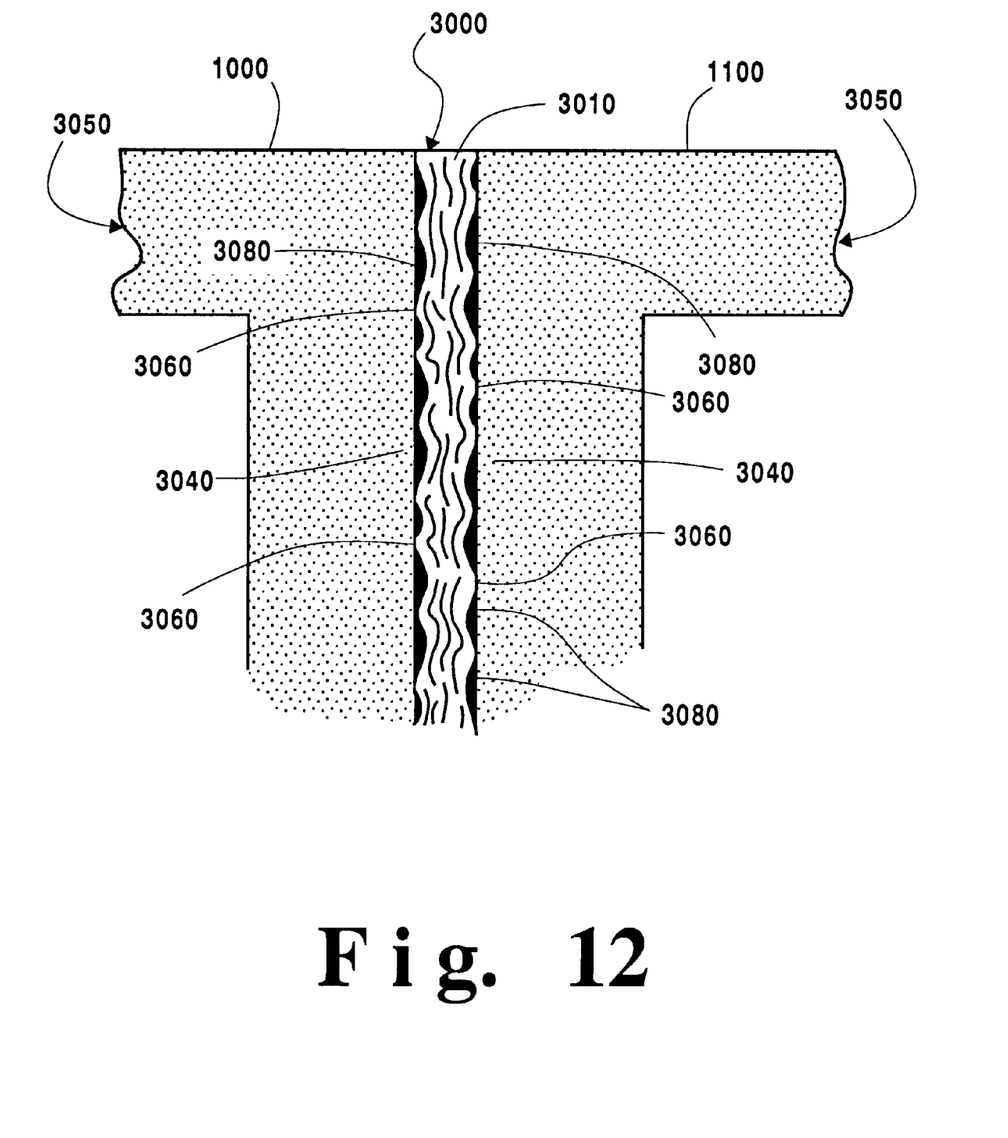
FIG. 12 shows, in section, an electrically conductive seal in accordance with the present invention.

In the improvement of the present invention, fluid flow field plates, formed of graphite, of the type described in FIGS. 8 and 8A are arranged in an assembly 2000 shown in FIG. 10 wherein a plurality of individual electrochemical fuel cells 500 are in the form of a stack in which the fuel cells 500 are in register and in tandem and held together between electrically conductive bus plates 2040 by compressive force 3050 applied by external, adjustable compression means 2010. The compressive force on the stack can be adjusted by way of threaded caps 2020 on threaded tie rods 2030 comprising threaded tie rods 2030 and threaded end caps 2020 in combination with bus plates 2040. In the assembly 2000, the individual electrochemically active fuel cells 5000 are configured to be electrically coupled in series by means of electrically conductive seals 3000 in accordance with the present invention. With reference to FIG. 11, a sheet of flexible graphite of a type suitable for use in the seal of the present invention is shown at 3010 having generally planar, parallel opposite surfaces 3020, 3030 which are uneven and porous to thermosetting resin. In the electrically conductive seal 3000 used with practice of the conductive seal 3000 of the present invention, with reference to FIG. 12, a sheet of flexible graphite 3010, impregnated with adhesive thermosetting resin, is arranged between the substantially planar inactive surfaces 3040 of adjacent flow field plates 1000, 1100 of the respective fuel cells 500 of the fuel cell assembly 2000 shown in FIG. 10. The compressive force 3050 applied by adjustable compression means 2010 establishes, on each side of the flexible graphite sheet, a graphite-to-graphite bearing contact at 3060 between planar graphite surfaces 3040 and flexible graphite sheet 3010 and also establishes, on each side of the flexible graphite sheet, pockets 3080 of adhesive thermosetting resin. An efficient electrically conductive path is thus provided through electrically conductive and liquid impermeable graphite sheet 3010 from the bearing, graphite-to-graphite, contacts 3060. Also, upon thermosetting of the resin in pockets 3080 and thermosetting of the resin impregnated in the flexible graphite sheet adjacent the pockets 3080, the flexible graphite sheet 3010 is rigidly bonded to the adjacent fluid flow field plates 1000, 1100.

Flexible graphite sheet for use in the seal of the present invention can be in the form of a mass of expanded, intercalated graphite particles compressed together, in the absence of a binder, as described in U.S. Pat. No. 3,404,061—Shane et al. Also, the flexible graphite sheet can be in the form of a compressed sheet formed of a combination of unexpanded intercalated graphite particles and exfoliated, expanded graphite particles as described in U.S. Pat. No. 5,176,863—Howard and U.S. Pat. No. 5,494,506—Ford et al. Flexible sheet as above-described can also contain ceramic fibers as described hereinabove, and is the preferred embodiment.

Flow field plates, with which the seal of the present invention can be combined can be formed of compressed sheets of expanded graphite as described in PCT Patent Publication WO 95/16287 (Jun. 15, 1995) and available under the trade designation "GRAFOIL" from UCAR CARBON COMPANY INC.

What is claimed is:

1. An assembly of electrochemical fuel cells arranged in register and in tandem in the form of a stack which is compressible by compressive force applied by compression means external to the stack wherein each fuel cell comprises a pair of fluid flow field plates having a membrane electrode assembly positioned between said fluid flow field plates, the improvement which comprises:

an electrically conductive seal compressed by said compression means between adjacent fuel cells of said stack, said seal being in the form of sheet of flexible graphite impregnated with an adhesive thermosetting resin on each side, the compression applied to the stack by said compression means being sufficient to establish a graphite-to-graphite bearing contact between portions of each side of the flexible graphite sheet and the fluid flow field plate of an abutting fuel cell, and to also establish a plurality of pockets of resin which are located between each side of the flexible graphite sheet and the fluid flow field plate of an abutting fuel cell such that upon thermosetting of the resin each sheet of flexible graphite is rigidly bonded on both sides to the fluid flow field plate of an abutting fuel cell by thermoset pockets of resin, and an electrically conductive path is provided from graphite-to-graphite bearing contacts on the surface of a fluid flow field plate through the flexible graphite sheet to graphite-to-graphite bearing contacts on the surface of another fluid flow field plate.

2. Assembly in accordance with claim 1 wherein the flexible sheet of graphite is provided with a pre-coated layer of an adhesive thermosetting resin on each side and the flexible sheet of graphite is impregnated with said resin in situ by compression force applied by said compression means.

* * * * *